(12) United States Patent
Kono et al.

(10) Patent No.: US 9,259,669 B2
(45) Date of Patent: Feb. 16, 2016

(54) PREPARATIVE SEPARATION/PURIFICATION SYSTEM

(75) Inventors: Yutaka Kono, Kyoto (JP); Masayuki Nishimura, Kyoto (JP); Bob Boughtflower, Harlow (GB); Przemyslaw Stasica, Stevenage (GB)

(73) Assignee: SHIMADZU CORPORATION, Kyoto (JP)

( * ) Notice: Subject to any disclaimer, the term of this patent is extended or adjusted under 35 U.S.C. 154(b) by 1096 days.

(21) Appl. No.: 12/681,323

(22) PCT Filed: Oct. 2, 2007

(86) PCT No.: PCT/JP2007/001072
§ 371 (c)(1),
(2), (4) Date: Jul. 22, 2010

(87) PCT Pub. No.: WO2009/044428
PCT Pub. Date: Apr. 9, 2009

(65) Prior Publication Data
US 2010/0300627 A1 Dec. 2, 2010

(51) Int. Cl.
*B01D 15/24* (2006.01)
(52) U.S. Cl.
CPC ..................................... *B01D 15/24* (2013.01)
(58) Field of Classification Search
CPC ......................................................... B01D 15/24
USPC .............. 210/635, 656, 96.1, 101, 143, 198.2
See application file for complete search history.

(56) References Cited

U.S. PATENT DOCUMENTS

| | | | |
|---|---|---|---|
| 4,465,554 A | 8/1984 | Glass | |
| 5,240,616 A * | 8/1993 | Kato et al. | 210/656 |
| 5,690,828 A * | 11/1997 | Clay et al. | 210/634 |
| 5,762,877 A * | 6/1998 | Brewer | 422/519 |
| 6,355,164 B1 * | 3/2002 | Wendell et al. | 210/198.2 |
| 6,423,120 B1 * | 7/2002 | Nickerson et al. | 95/87 |
| 6,908,557 B2 * | 6/2005 | Chordia et al. | 210/659 |

(Continued)

FOREIGN PATENT DOCUMENTS

| | | |
|---|---|---|
| DE | 101 53 670 A1 | 5/2002 |
| JP | 02-122260 A | 5/1990 |
| JP | 09-080040 A | 3/1997 |
| JP | 2002-202316 A | 7/2002 |
| JP | 2003-149217 A | 5/2003 |
| JP | 2004-354222 A | 12/2004 |

OTHER PUBLICATIONS

PTO 12-6323 Translation of Japan Patent No. 09080040*
Japanese Office Action dated Jun. 7, 2011, issued in corresponding Japanese Patent Application No. 2009-535888.
United Kingdom Office Action dated Dec. 6, 2011, for the corresponding United Kingdom Patent Application No. 1006549.8.

*Primary Examiner* — Ernest G Therkorn
(74) *Attorney, Agent, or Firm* — Sughrue Mion, PLLC

(57) ABSTRACT

Collection containers (17) are heated by head conduction from a container rack (18) with a heater (19) as the heat source. When an eluting solvent is supplied into a trap column (7) by a pump (5), an eluate containing a target compound exiting from the column (7) flows through a preparative separation passage (13) and drips from a solution nozzle (13a), and this solution is separated into fine droplets by a gas stream blowing from a gas ejection nozzle (15a). When a droplet touches an inner wall of the container (17), the volatile solvent immediately vaporizes, leaving the target compound precipitated in solid forms on the inner wall. Thus, the process of vaporizing and drying the eluate to collect the target compound is completed within a short period of time. This process can be performed online and hence is suitable for labor-saving.

6 Claims, 4 Drawing Sheets

( a )

( b )

(56) References Cited

U.S. PATENT DOCUMENTS

| | | | |
|---|---|---|---|
| 7,317,187 B2 * | 1/2008 | Davidson et al. | 250/288 |
| 2002/0122745 A1 | 9/2002 | Takase et al. | |
| 2002/0144949 A1 * | 10/2002 | Berger et al. | 210/656 |
| 2004/0238427 A1 * | 12/2004 | Maruyama et al. | 210/198.2 |
| 2005/0006291 A1 * | 1/2005 | Iwata et al. | 210/198.2 |
| 2006/0054543 A1 * | 3/2006 | Petro et al. | 210/198.2 |
| 2006/0091053 A1 | 5/2006 | Maruyama et al. | |
| 2008/0053908 A1 * | 3/2008 | Chordia et al. | 210/656 |

* cited by examiner

PREPARATIVE SEPARATION/PURIFICATION SYSTEM

CROSS REFERENCE TO RELATED APPLICATIONS

This application is a National Stage of International Application No. PCT/JP2007/001072 filed Oct. 2, 2007, the contents of all of which are incorporated herein by reference in their entirety.

TECHNICAL FIELD

The present invention relates to a preparative separation/purification system for separately purifying and collecting one or more components individually extracted from a solution by a liquid chromatograph.

BACKGROUND ART

For example, in the pharmaceutical industry, preparative separation/purification systems utilizing liquid chromatographs are used to collect samples of a variety of chemically synthesized compounds in order to store those samples in a library or analyze them in more detail. Conventional examples of the preparative separation/purification system are disclosed in Patent Documents 1 and 2.

In these conventional apparatuses, target components (compounds) in a sample solution are temporally separated by a liquid chromatograph. The separated target components are then respectively introduced into different trap columns and temporarily captured therein. Subsequently, a solvent is supplied into each trap column to quickly elute the component from the trap column and collect it in a container. Thus, a plurality of solutions each containing one target component at a high concentration are respectively collected in a plurality of containers. These separately collected solutions are then subjected to a vaporizing and drying process to remove the solvent and collect the target components in solid forms. The vaporizing and drying process normally includes heating the collected solutions or centrifuging them under a vacuum.

According to the aforementioned conventional method, however, a single vaporizing and drying process requires a long period of time of, for example, several hours to one day. In the pharmaceutical industry, various efforts have been made to improve the efficiency of searching for a large number of synthetic compounds for medicinal compounds; for example, the analysis time has been reduced by using faster analysis apparatuses or optimizing the analytical methods. Reducing the time required for the vaporizing and drying process is a critical issue since this process consumes, within the entire process, the longest period of time.

Performing an additional process, such as a vacuum centrifugal separation, further lowers the efficiency since it requires an additional task, such as setting an eluate collected by the preparative separation into a vacuum centrifugal separator.

Patent Document 1: Japanese Unexamined Patent Application Publication No. H2-122260
Patent Document 2: Japanese Unexamined Patent Application Publication No. 2003-149217

DISCLOSURE OF THE INVENTION

Problem to be Solved by the Invention

The present invention has been developed in view of the previously described problems, and its target is to provide a preparative separation/purification system capable of efficiently obtaining a target component in solid forms by quickly vaporizing and drying an eluate containing the target component separated by a column of a preparative liquid chromatograph or an eluate containing the target component temporarily captured in a trap column and then re-extracted from the same column. Another target of the present invention is to provide a preparative separation/purification system capable of performing the vaporizing and drying of an eluate by an online process without using a separate apparatus.

Means for Solving the Problems

A first aspect of the present invention aimed at solving the previously described problems is a preparative separation/purification system for obtaining a target component in solid forms by vaporizing the solvent in a solution containing the target component obtained by a preparative separation process, which is characterized by including:
a) a container for collecting the target component in solid forms;
b) a heating means for heating the container;
c) a solution passage and a liquid supply means for supplying the solution so that the solution is dripped or poured into the container; and
d) a gas supply means for producing a gas stream so as to scatter the solution dripped or poured from the end of the solution passage into the container,
where vaporization of the solvent in the solution is accelerated by producing the gas steam by the gas supply means so that the gas stream separates the solution into droplets and brings these droplets into contact with an inner wall of the container heated by the heating means, to obtain the target component in dry, solid forms.

A second aspect of the present invention aimed at solving the previously described problems is a preparative separation/purification system for obtaining a target component in solid forms by vaporizing the solvent in a solution containing the target component obtained by a preparative separation process, which is characterized by including:
a) a container for collecting the target component in solid forms;
b) a heating means for heating the container;
c) a solution passage and a liquid supply means for supplying the solution so that the solution is dripped or poured into the container; and
d) a gas supply means for producing a gas stream so that the gas stream is directly brought into contact with the solution gathered in an inner bottom portion of the container after being dripped or poured from the end of the solution passage into the container, where vaporization of the solvent in the solution gathered in the inner bottom portion of the container is accelerated by agitating the solution by the gas stream produced by the gas supply means and supplying heat by the heating means, to obtain the target component in dry, solid forms.

In the preparative separation/purification systems according to the first and second aspects of the present invention, the solution containing the target component may be a solution prepared by sampling an eluate that contains a specific target component separated by a column of a preparative liquid chromatograph, and then supplied by being pushing by a solvent supplied by a pump or similar device. Otherwise, it may be an eluate that contains a target component obtained by separating a specific target component from other components, temporarily capturing the compound in a trap column, and then supplying into the trap column a solvent having a strong elution capability to re-eluate the target component.

For the aforementioned gas, an inert gas is generally preferable. For example, helium, argon and nitrogen are available.

In the preparative separation/purification system according to the first aspect of the present invention, the solution containing the target component is supplied into the solution passage by the liquid supply means and then dripped or poured from the end of the solution passage directed into the container. The dripped or poured solution is broken into fine droplets by the gas stream produced by the gas supply means and scattered within the container. When a droplet adheres to the inner wall of the heated container, the solvent in the droplet quickly vaporizes since its heat capacity is small, leaving the target component precipitated on the inner wall of the container. For example, when the solvent is dichloromethane or another organic solvent having a similarly low boiling point (the boiling point of dichloromethane is approximately 40 degrees Celsius), the container needs only to be heated to approximately degrees Celsius.

However, even if the solution is broken into fine droplets and scattered as in the preparative separation/purification system according to the first aspect of the present invention, the solvent in the droplets may not completely vaporize upon touching the inner wall of the container but flow down on the inner wall, to be gathered at the bottom of the container. This situation is particularly possible when the solution has a relatively high water content or the solvent is poorly volatile. In the preparative separation/purification system according to the second aspect of the present invention, a strong stream of gas is supplied by the gas supply means against a thin layer of the solution gathered in the inner bottom portion of the container. The gas stream agitates the gathered solution, making the layer even thinner at the portion hit by the gas stream. Therefore, the heat exchange between the solution and the bottom of the heated container occurs more effectively, causing the solvent in the solution to vaporize more quickly while leaving the target component precipitated on the inner bottom surface of the container.

It is naturally possible to combine the first and second aspects of the present invention. That is, it is possible to use both a gas stream for scattering the solution dripped or poured into the container and a gas stream supplied against the solution gathered in the inner bottom portion of the container. This combination will more assuredly and quickly vaporize the solvent in the solution to obtain the target component in solid forms.

In the preparative separation/purification systems according to the first and second aspects of the present invention, raising the temperature of the gas hitting the solution will improve the efficiency of vaporizing the solvent accordingly. It is therefore preferable to additionally provide a gas-heating means for heating the gas before the gas is ejected into the container by the gas supply means.

In the preparative separation/purification systems according to the first and second aspects of the present invention, if the solution has a higher temperature when it is dripped or poured from the end of the passage into the container, the solvent will be more efficiently vaporized when it is scattered or hit by the gas stream. It is therefore preferable to additionally provide a solution-heating means for heating the solution before the solution is dripped or poured into the container by the liquid supply means.

As one mode of the preparative separation/purification systems according to the first and second aspects of the present invention, the solution passage and the gas passage may be separately provided. Alternatively, the end of the solution passage and the gas ejection port of the gas supply means may constitute a double-tube structure. In this case, the gas (or solution) can be supplied through either of the inner and outer passages of the double-tube structure. Of course, a structure with three or more tubes is also adoptable.

EFFECT OF THE INVENTION

The preparative separation/purification systems according to the first and second aspects of the present invention can perform the vaporizing and drying process of an eluate containing a target compound to obtain the target component in solid forms within a shorter period of time than ever before. Particularly, when the system is combined with a system in which the target component is temporarily captured by a trap column and then the target component is re-eluted by supplying a highly volatile solvent into the trap column after residual water is removed from the trap column, the target component in solid forms can be more efficiently collected and the throughput is improved. The target component in solid forms can be collected in an online manner, i.e. while the solution is continuously supplied. Therefore, the solution containing the target component temporarily captured in the container does not need to be transferred to another apparatus, such as a vacuum centrifugal separator, so that the work is easy to perform and suitable for automation.

EXPLANATION OF NUMERALS

Figure 1:
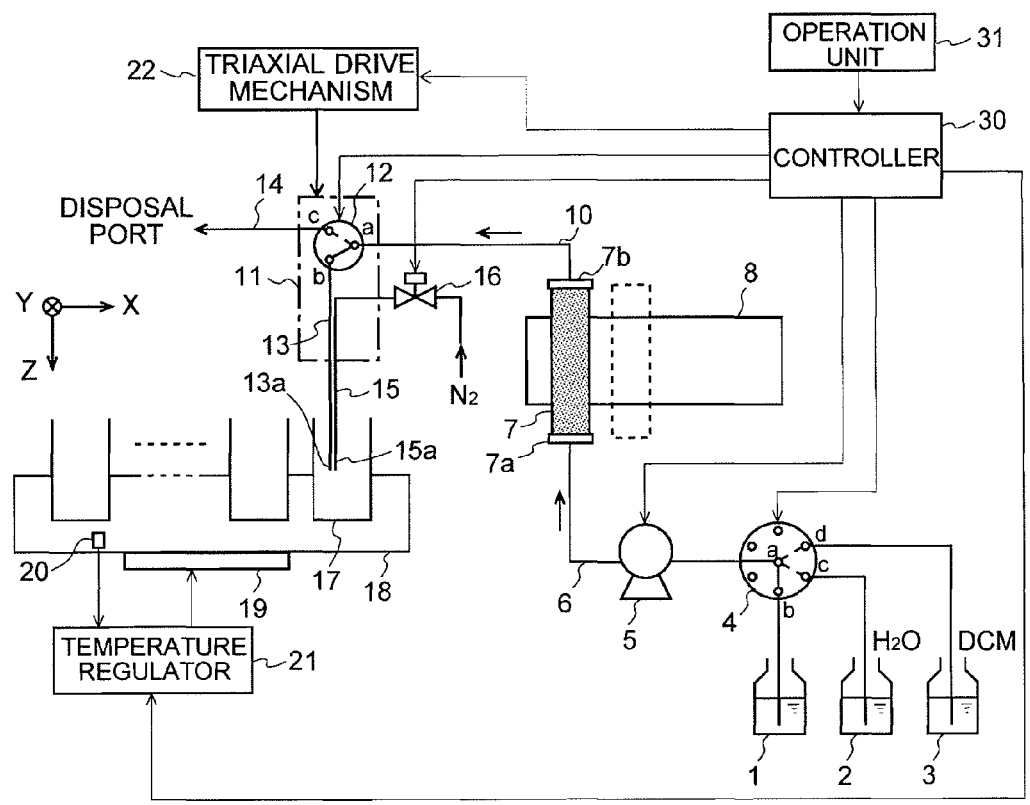
FIG. 1 is a schematic configuration diagram of a preparative separation/purification system according to one embodiment of the present invention.

1 . . . . Solution Container
2 . . . . Wash Water Container
3 . . . . Eluting Solvent Container
4 . . . . Selector Valve
5 . . . Pump
6 . . . . Supply Passage
7 . . . . Trap Column
7a . . . . Inlet End
7b . . . . Outlet End
8 . . . . Column Rack
10 . . . . Discharge Passage 11 . . . . Fraction Collection Head
12 . . . . Two-Way Selector Valve
13 . . . Preparative Separation Passage
13a . . . . Solution Nozzle
14 . . . . Disposal Passage
15 . . . . Gas Passage
15a . . . . Gas Ejection Nozzle
16 . . . On/Off Valve
17 . . . . Collection Container
18 . . . . Container Rack
19 . . . . Heater
20 . . . . Temperature Sensor
21 . . . . Temperature Regulator
22 . . . . Triaxial Drive Mechanism
23 . . . . Disposal Port
30 . . . . Controller
31 . . . . Operation Unit Best Mode for Carrying out the Invention One embodiment of the preparative separation/purification system according to the present invention is hereinafter described with reference to FIGS. 1 to 5. FIG. 1 is a schematic configuration diagram of the preparative separation/purification system of the present embodiment. The present preparative separation/purification system is designed to obtain a target component in purified, solid forms from a solution containing the target component previously separated by a preparative liquid chromatograph (not shown). Alternatively, it is possible to directly connect the preparative liquid chromatograph to the upstream side of the present system so as to directly introduce a solution containing a target component separated by the preparative liquid chromatograph.

In FIG. 1, a solution container 1 holds a solution that has been separated beforehand as stated earlier. The solvent of this solution, which contains a target compound, is mainly composed of a mobile phase used in the preparative liquid chromatograph. A wash water container 2 holds pure water acting as the first solvent of the present invention, while an eluting solvent container 3 holds dichloromethane (labeled "DCM" in the figure) acting as the second solvent of the present invention. A selector valve 4 is provided to change the passage configuration so that one of the liquids held in these containers 1, 2 and 3 is selectively supplied to a supply passage 6 on which a pump 5 for drawing a liquid at a predetermined flow rate is provided.

A trap column 7 filled with an adsorbent for capturing the target component is held in a substantially vertical position by a column rack 8, which corresponds to the column-holding means of the present invention. The inlet end 7a, to which the aforementioned supply passage 6 is connected, is directed downwards, while the outlet end 7b, to which a discharge passage (to be described later) 10 is connected, is directed upwards. Although FIG. 1 shows only one trap column 7, it is possible to hold two or more trap columns, side by side, as indicated by the dotted line in FIG. 1.

A discharge passage 10 has one end connected to the outlet end 7b of the trap column and the other end to port a of a two-way selector valve 12 embedded in a fraction collection head 11. A preparative separation passage 13 is connected to port b of the selector valve 12, while a disposal passage 14 leading to a disposal port (not shown) is connected to port c. The two-way selector valve 12 connects either the preparative separation passage 13 or the disposal passage 14 to the discharge passage 10. The other end of the preparative separation passage 13 is a solution nozzle 13a for dripping the supplied solution. A gas ejection nozzle 15a at the end of a gas passage 15 is located close to the solution nozzle 13a. An on/off valve 16 is provided on the gas passage 15. When the on/off valve 16 is opened, a nitrogen gas (or any other inert gas) supplied from a gas cylinder or similar source (not shown) is ejected from the gas ejection nozzle 15a.

A plurality of collection containers 17 for collecting the separated and purified target components are held in a container rack 18, which is provided with a heater 19 and a temperature sensor 20, such as a thermistor. The container rack is made of a material having a high thermal conductivity, such as aluminum, and externally covered with an insulator to prevent the heat from escaping to the outside. At least the bottoms of the plurality of collection containers 17 are in close contact with the container rack 18 so that the heat from the container rack 17 can be easily conducted to them. It is further desirable to also make the side surface of each container 17 in contact with the container rack 18. A temperature regulator 21, which is located separately from the container rack 18, regulates the heating current supplied to the heater 19 so that the temperature monitored with the temperature sensor 20 will be maintained at a target temperature. By this heating process, the collection containers 17 are maintained at an appropriate constant temperature.

The fraction collection head 11 can be moved in the horizontal direction (X and Y directions in FIG. 1) and vertical direction (Z directions in FIG. 1) by a triaxial drive mechanism 22 including, for example, a plurality of motors. By this mechanism, the head can be horizontally moved to a position above any one of the collection containers 17 held in the container rack 18 and then vertically lowered to insert the solution nozzle 13a and the gas ejection nozzle 15a into the selected container 17 so that the solution can be assuredly dripped into this collection container 17. Instead of moving the fraction collection head 11, it is also possible to move the container rack 18 so that a solution dripped from the solution nozzle 13a will fall into any one of the collection containers 17 held in the container rack 18.

A controller 30 including a central processing unit (CPU) and other components automatically performs a preparative separation/purification task by switching the valves 4 and 12, controlling the operation of the pump 5 (the flow rate or flow velocity), setting a target temperature for the temperature regulator 21, and moving the fraction collection head 11 through the triaxial drive mechanism 22 according to a previously prepared program. An operation unit 31 allows users to enter the conditions and other information relating to the preparative separation/purification task.

Figure 2:
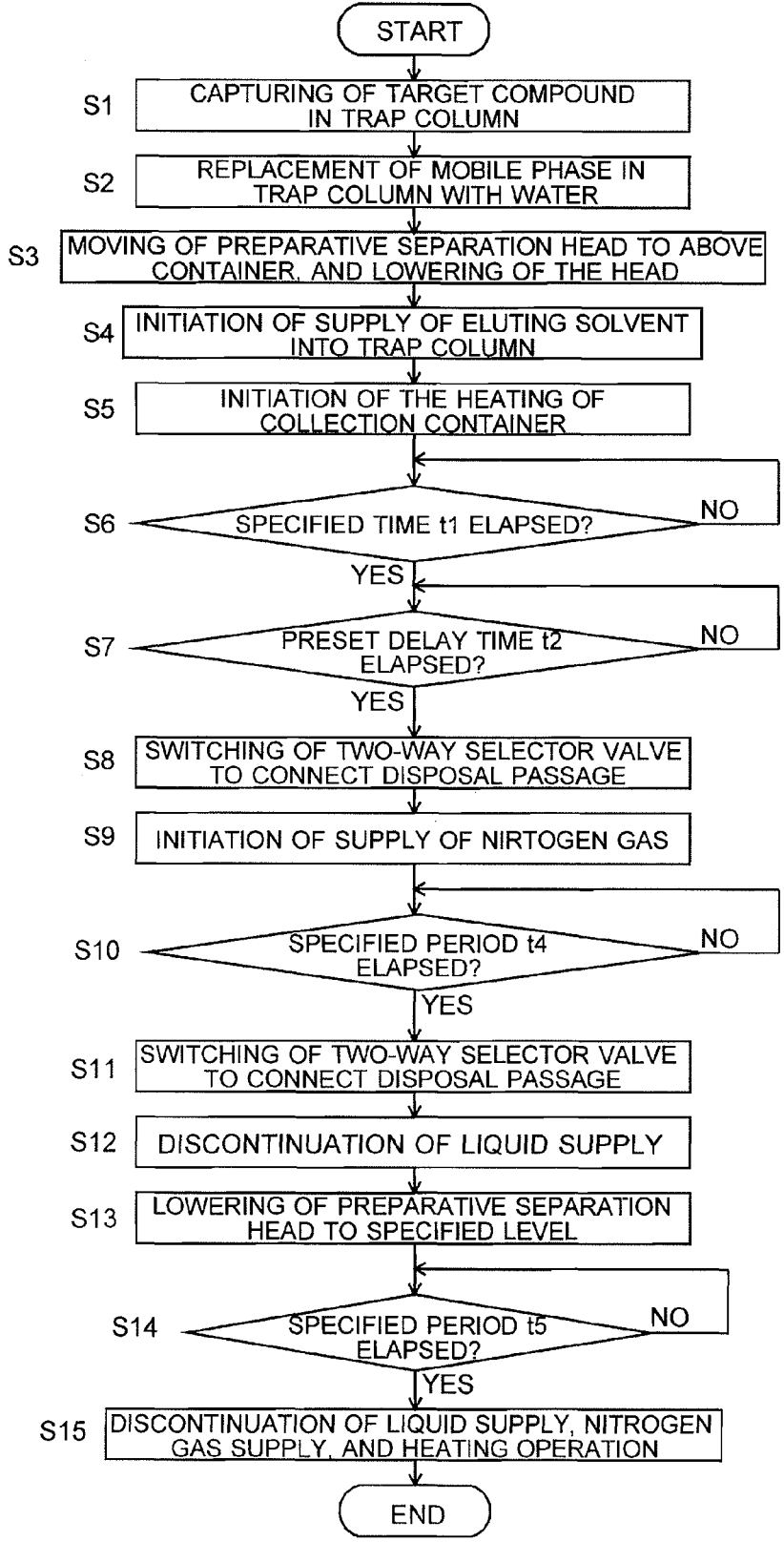
FIG. 2 is a control flowchart for an automatic preparative separation/purification in the preparative separation/purification system of the present embodiment.
Figure 3:
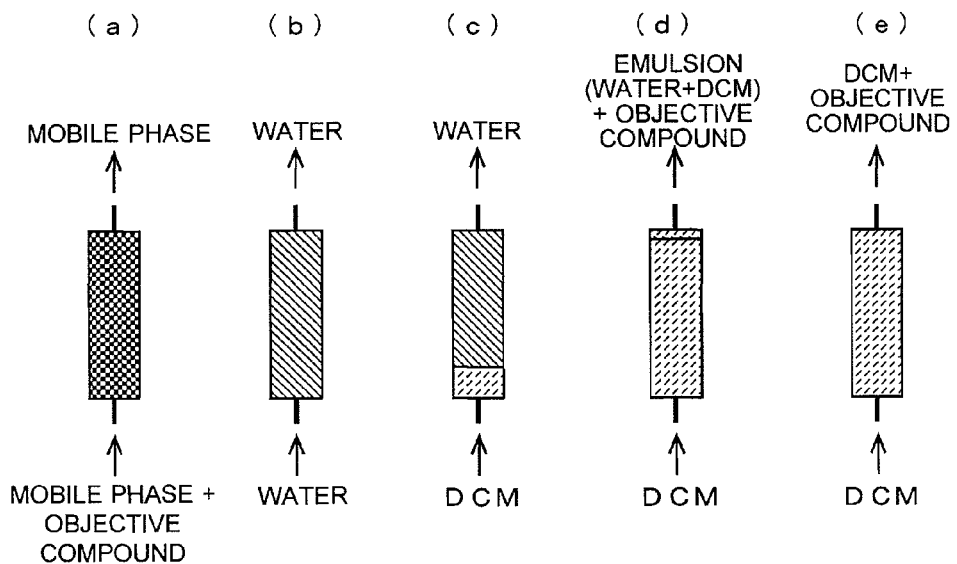
FIG. 3 is a model diagram for illustrating how the solvent (liquid) within a trap column changes during the automatic preparative separation/purification operation.
Figure 4:
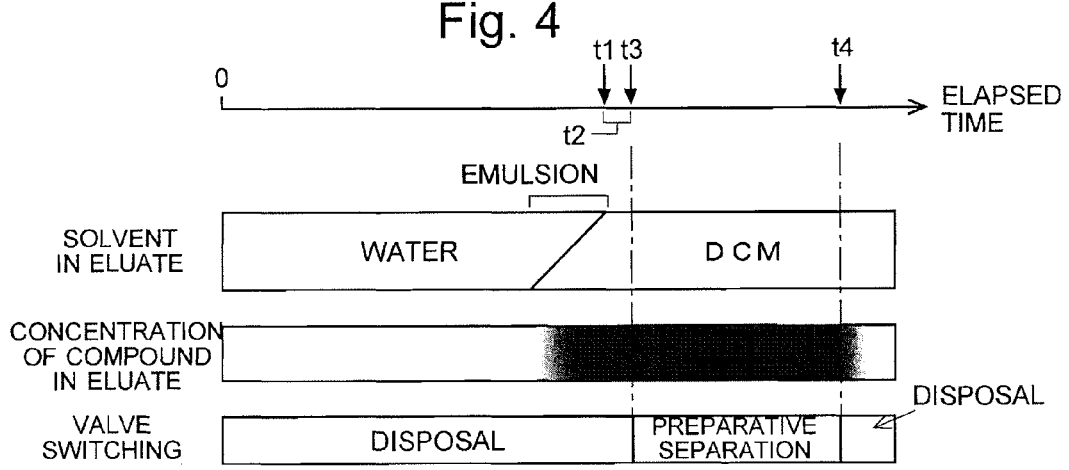
FIG. 4 is an illustration showing how the solvent and target compound in an eluate from the trap column respectively change with time during the automatic preparative separation/purification operation.
Figure 5:
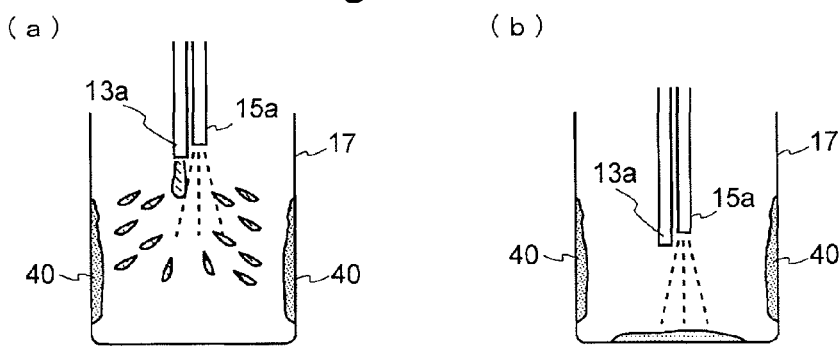
FIG. 5 is a schematic diagram for explaining the process of drying and vaporizing an eluate containing a target component in the preparative separation/purification system of the present embodiment.

An automatic preparative separation/purification operation in the preparative separation/purification system of the present embodiment is hereinafter described with reference to FIGS. 2 to 5. FIG. 2 is a control flowchart for this automatic preparative separation/purification process, FIG. 3 is a model diagram for explaining how the solvent in the trap column 7 changes during the automatic preparative separation/purification operation, FIG. 4 is an illustration showing how the solvent and target compound in an eluate from the trap column 7 change with time during the automatic preparative separation/purification operation, and FIG. 5 is a schematic diagram for explaining the process of drying and vaporizing an eluate containing a target component.

To capture a target compound onto the adsorbent within the trap column 7, the controller 30 initially connects the solution container 1 (port b) and the supply passage 6 (port a) via the selector valve 4 and activates the pump 5 to supply the liquid at a predetermined constant flow rate. The controller 30 also connects the discharge passage 10 (port a) and the disposal passage 14 (port c) via the two-way selector valve 12. The pump 5 draws the solution from the solution container 1 and delivers it through the inlet end 7a into the trap column 7.

Then, the target compound in the solution is captured by the adsorbent (Step S1). The mobile phase from which the target compound has been removed exits from the outlet end 7b, to be disposed of via the discharge passage 10 and the disposal passage 14 to the disposal port (refer to FIG. 3(a)).

After the solution is supplied into the trap column 7 for a predetermined period of time or until the solution prepared in the solution container 1 is exhausted, the controller 30 switches the selector valve 4 to connect the wash water container 2 (port c) and the supply passage 6 (port a). Then, the pump 5 draws pure water from the wash water container 2 and delivers it through the inlet end 7a into the trap column 7. By this process, any unwanted water-soluble substance (e.g. a salt) adhered to the adsorbent in the previous process of capturing the target component is removed from the inside of the trap column 7 (Step S2). As a result of supplying the pure water, the mobile phase stored in the trap column 7 immediately before the initiation of the water supply is replaced with water, and this water eventually fills the trap column 7, as shown in FIG. 3(b). The target compound captured on the adsorbent can barely elute into water due to a strong adsorption effect. Therefore, at this point in time, the target compound is still captured in the trap column 7.

Subsequently, a substantial preparative separation operation is initiated, where the controller 30 instructs the triaxial drive mechanism 22 to move the fraction collection head 11 to a point over a previously selected collection container 17 and then lower the fraction collection head 11 to a predetermined level so as to insert the solution nozzle 13a and the gas ejection nozzle 15a into the container 17 (Step S3). Next, the controller 30 switches the selector valve 4 to connect the eluting solvent container 3 (port d) and the supply passage 6 (port a). Then, the pump 5 draws dichloromethane from the eluting solvent container 3 and begins to introduce it through the inlet end 7a into the trap column 7 (Step S4). At this stage, the supply flow rate of the pump 5 is set at a predetermined level lower than in the previous case of supplying the solution or pure water. Additionally, the controller 30 specifies a target temperature for the temperature regulator 21 and initiates the heating of the container rack 28 and thereby the heating of the collection containers 17 (Step S5). The target temperature may be approximately equal to or somewhat higher than the boiling point of dichloromethane, i.e. 40 to 45 degrees Celsius.

Dichloromethane has a specific gravity of 1.32, which is larger than that of water, and is not compatible with water. Furthermore, its flow velocity within the trap column 7 is low since, as stated earlier, its supply flow rate is low. Therefore, when dichloromethane is introduced from the inlet end 7a of the trap column 7, it barely mixes with water present within the trap column 7, as shown in FIG. 3(c), and the interface between dichloromethane and water gradually rises. In other words, dichloromethane gradually accumulates from the bottom of the trap column while pushing water upwards. The pushed water overflows from the outlet end 7b at the upper end of the trap column 7 and flows through the two-way selector valve 12 and the disposal passage 14 and eventually reaches the disposal port.

Although dichloromethane and water are insoluble with each other, they partially form an emulsion. Therefore, as shown in FIG. 3(d), as the interface between water and dichloromethane comes closer to the upper end of the trap column 7, the eluate from the outlet end 7b of the trap column 7 changes from water to an emulsion (solution of dispersion system). Since dichloromethane has a strong elution power, the target compound that is captured by the adsorbent will dissolve in dichloromethane even through it cannot be eluted by water. Accordingly, almost simultaneously with the initial discharging of the emulsion from the trap column 7, the target compound will begin to be contained in the eluate. However, while the eluate is an emulsion, the content of the target compound is relatively low, and its concentration gradually increases.

If an emulsion exiting from the trap column 7 were separately collected for the subsequent stages, it would require a long period of time to vaporize the collected solution since water is included in it. Taking this into account, the controller 30 calculates the period of time t1 required to completely remove water, and repeatedly determines whether the elapsed time from the initiation of the supply of dichloromethane has reached the time t1 specified by the calculation (Step S6). This period of time t1 is calculated from the void volume within the trap column 7 (i.e. the volume of water present within the trap column 7 immediately before the introduction of dichloromethane is initiated) and the flow rate of dichloromethane supplied by the pump 5.

Even after the specified time t1 has elapsed, it is possible that some amount of water remains in the trap column 7 and causes the aforementioned emulsionization of the eluate. Therefore, in many cases, it requires an additional period of time to completely remove water from the trap column 7. Accordingly, the present system defines this additional period of time as the delay time t2 and allows users to set its value through the operation unit 31 in advance of the preparative separation/purification task. After recognizing that the specified time t1 has elapsed from the initiation of the supply of dichloromethane, the controller 30 subsequently determines whether the delay time t2 has elapsed (Step S7). At a point in time t3 where it is determined that the delay time t2 has elapsed, the controller 30 switches the two-way selector valve 12 from the disposal passage 14 to the preparative separation passage 13 to initiate the preparative separation of the target component (Step S8).

Elongating the delay time t2 causes a corresponding increase in the amount of disposal of the eluate exiting from the trap column 7 with the target compound contained therein, and hence a higher percentage of the target compound will be wasted (i.e. not separately collected) among the entire amount captured in the trap column 7. Although the collection rate of the target compound thus decreases, this method can effectively prevent water from being included in the collected eluate, so that the eluate will be more efficiently vaporized and dried. If priority should be given to improving the collection rate of the target compound, the delay time can be shortened to minimize the wasted amount of the target compound while allowing some amount of water to be included in the collected eluate. Thus, users can appropriately set the delay time t2 according to various factors, such as the collection rate of the target compound and the time (or throughput) required to obtain the target compound in solid forms.

The controller 30 switches the two-way selector valve 12 to the preparative separation passage 13 to initiate the preparative separation of the eluate and also opens the on/off valve 16 to initiate the supply of nitrogen gas through the gas supply passage 15 (Step S9). Then, the nitrogen gas passing through the gas passage 15 begins to blow out from the gas ejection port 15a. The eluate from the trap column 7, i.e. dichloromethane containing the target compound, flows through the preparative separation passage 13 and eventually drips from the solution nozzle 13a. Due to the closely located stream of gas ejected from the gas ejection nozzle 15a, the dripped eluate does not directly fall but is broken into fine droplets and scattered around, as shown in FIG. 5(a).

The collection containers 17 are heated by the heat conduction from the container rack 18 having the heater 19 as the heat source to a temperature that approximately equals the boiling point of dichloromethane. Therefore, when a fine droplet adheres to the inner circumferential wall or inner bottom wall of the collection container 17, the solvent (i.e. dichloromethane) in the droplet immediately vaporizes, leaving the target compound in solid forms. Thus, the target compound in solid forms is accumulated on the inner circumferential wall and inner bottom wall of the collection container 17.

The amount of the target compound captured by the adsorbent in the trap column 7 is limited. Therefore, after a certain period of time has elapsed from the initiation of the introduction of dichloromethane into the trap column 7, the concentration of the target compound in the eluate declines, as shown in FIG. 4. Accordingly, taking into account the internal volume of the trap column 7 (or the amount of adsorbent in the column) and the flow rate of dichloromethane supplied by the pump 5, the controller 30 calculates the period of time t4 required for completely eluting the target compound, and then checks whether the time elapsed from the initiation of the supply of dichloromethane has reached the time t4 specified by the calculation (Step S10). When the predetermined specified period of time t4 has elapsed, the preparative separation process is discontinued by resetting the two-way selector valve 12 to the disposal passage 14 (Step S11) and deactivating the pump 5 (Step S12).

In the case where the solvent used for re-eluting the target compound is a highly volatile solvent, like dichloromethane, and no water is included in it, the solvent in the droplet will quickly vaporize as soon as the droplet is adhered to the inner wall surface of the collection container 17, and the solution will barely deposit at the bottom of the collection container 17. However, if a low-volatility solvent is used, or if the solvent includes a relatively large amount of water, the solvent in the droplet that has come into contact with the inner wall surface of the heated collection container 17 does not immediately vaporize, and some droplets in the form of solution may flow down on the inner wall, to be gathered at the bottom of the collection container 17. Given this situation, the controller 30 operates the triaxial drive mechanism 22 to further descend the fraction collection head 11 to a predetermined lower level in order to promote the vaporization of the solvent gathered at the bottom of the collection container 17 (Step S13).

By this operation, the gas ejection nozzle 15a is brought closer to the bottom of the collection container 17, as shown in FIG. 5(b), and the nitrogen gas ejected from the gas ejection nozzle 15a powerfully hits the bottom of the container 17. Due to this powerful stream of gas, the solution gathered at the bottom of the container 17 is agitated and the solution layer becomes thinner at the portion directly hit by the gas stream, whereby the solvent is promptly vaporized, leaving the target component also precipitated on the inner bottom wall. When a previously specified period of time t5 has elapsed (YES in Step S14), the preparative separation/preparation task is halted by closing the on/off valve 16 to discontinue the supply of nitrogen gas and discontinuing the heating of the container rack 18 (Step S15).

It should be noted that Steps S13 and S14 may be omitted if the solvent for re-elution is highly volatile and water is adequately removed by the previously described method. If there is another solution containing a different compound, the preciously described process steps can be similarly repeated to introduce that solution into the trap column 7 to capture the compound and then re-elute the compound to collect it into another collection container 17.

As described to this point, in the preparative separation/purification system according to the present embodiment, the solvent of a solution containing a target compound re-eluted from the trap column 7 can be quickly vaporized in an online process and the target compound in solid forms can be collected in the collection container 17.

Figure 6:
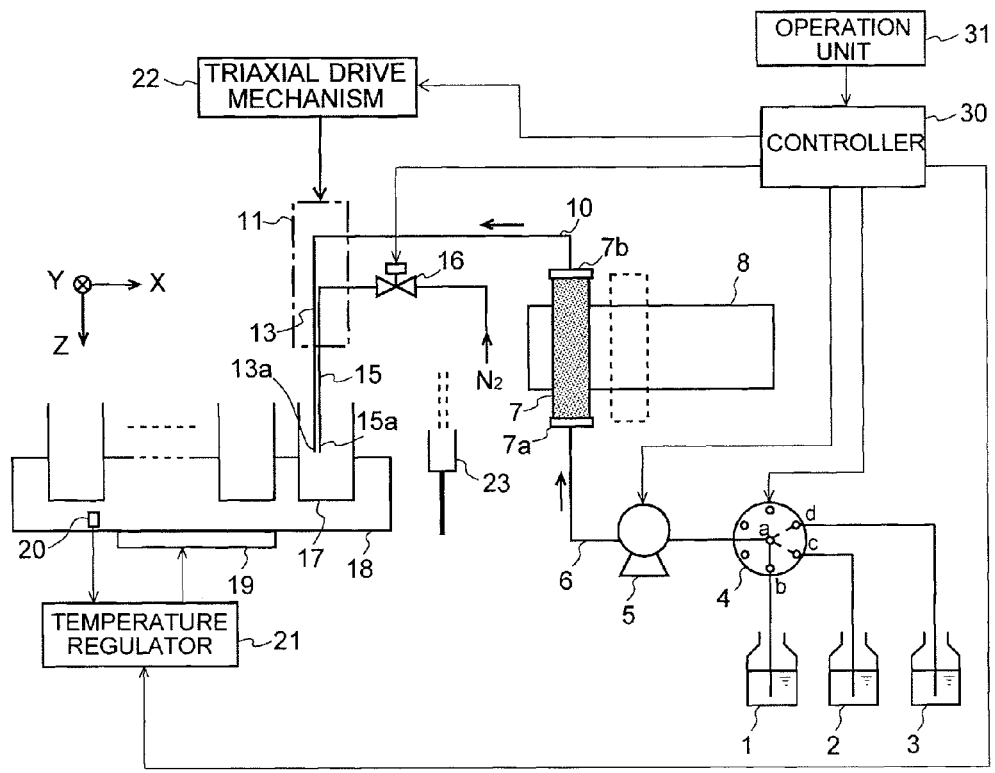
FIG. 6 a schematic configuration diagram of a preparative separation/purification system according to another embodiment of the present invention.

A variation of the preparative separation/purification system according to the present invention is hereinafter described with reference to FIG. 6. FIG. 6 is a schematic configuration diagram of the preparative separation/purification system according to the present variation. The same components as mentioned in the previous embodiments are denoted by the same numerals and hence will not be specifically described. The present variation differs from the previous embodiment in the configuration and operation of the mechanism for disposing of an eluate from the trap column 7; in the previous embodiment, the eluate from the trap column 7 can be selectively guided to the disposal port and disposed of by switching the two-way selector valve 12 embedded in the fraction collection head 11.

That is, the preparative separation/purification system of the present variation does not have the two-way selector valve 12; the eluate from the trap column 7 is entirely introduced into the preparative separation passage 13 and dripped from the solution nozzle 13a. Additionally, a disposal port 23, which includes a liquid reservoir and a disposal passage leading to a disposal tank (not shown), is provided within a movable range of the fraction collection head 11 actuated by the triaxial drive mechanism 22. Instead of the period of time when the discharge passage 10 and the disposal passage 14 are connected via the two-way selector valve 12 in the previous embodiment, the present system has a period of time when the fraction collection head 11 is moved to a point above the liquid reservoir of the disposal port 23 so that the solution dripped from the solution nozzle 13a will be collected in the disposal port 23. By this operation, unnecessary solutions (e.g. a mobile phase after the target compound has been captured on the adsorbent in the trap column 7 or water used for washing the inside of the trap column 7) is disposed of to exclusively introduce dichloromethane containing the target compound into the collection container 17.

In the previous embodiment, the vaporization of the solvent in the solution touching the inner wall of the collection containers 17 is accelerated by heating these containers 17 via the container rack 18. It is additionally desirable to raise the temperature of the nitrogen gas ejected from the gas ejection nozzle 15a since this operation will accordingly increase the amount of heat given to the solution and thereby further accelerate the vaporization of the solvent. For this purpose, it is desirable, for example, provide a heat exchanger through which the gas passage 15 is passed to raise the gas temperature by the heat exchanger. Similarly, for the purpose of accelerating the vaporization of the solvent, the solution discharged from the trap column 7 may be heated to raise its temperature. This can be achieved, for example, by passing the discharge passage 10 through a heat exchanger.

The previous embodiment dealt with the case where only one trap column 7 was used. It is also possible to use a plurality of trap columns 7 as follows: A plurality of trap columns, each having the same or different compound captured therein beforehand, are set in the column rack 8. A passage selection means (valve) for selectively connecting one of these columns to the supply passage 6 and the discharge passage 10 is provided so that the compound in the selected trap column can be eluted. With this system, it is possible to separately elute the compounds from the plurality of the trap columns and collect each compound in a different collection container. Other than the method using the passage selection means, there are other methods for connecting the plurality of trap columns and the passage means; for example, it is possible to provide a sealing portion around the connection ports at both ends of each trap column and clamp the trap column from both ends by a pair of piping parts each having a shape that fits the sealing portion to create a high-pressure seal.

Figure 7:
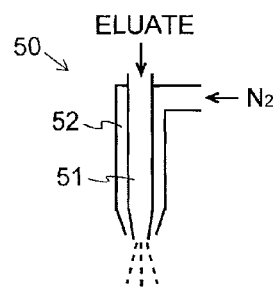
FIG. 7 is a schematic configuration diagram of a solution nozzle and gas ejection nozzle of a preparative separation/purification system according to another embodiment of the present invention.

The effect of separating a solution dripped from the solution nozzle 13a into fine droplets and scattering them by a gas stream can be more improved by appropriately modifying the nozzle shape, the gas-blowing method and/or other aspects of the gas supply means. One example is shown in FIG. 7, where the nozzle 50 has a coaxial double-tube structure consisting of an inner tube 51 to supply the solution and an outer tube 52 to supply the nitrogen gas. Alternatively, the nozzle may have a multi-tube structure with three or more tubes. Passing the nitrogen gas through the inner tube 51 and the solution through the outer gas 52 is also possible. Supplying the gas stream obliquely to the vertical stream of solution may also work fine. There are additionally many other possible variations.

It should be noted that the previous embodiments are mere examples of the present invention, and any change, modification and/or addition appropriately made within the spirit of the present invention will evidently fall within the scope of claims of this patent application.

In the previous embodiment, for ease of explanation, the solutions in the containers 1 to 3 shown in FIGS. 1 and 3 are all supplied from the inlet end 7a at the lower end of the trap column 7. However, target components are normally captured at an internal portion near the inlet of the trap column 7. Therefore, in order to assuredly retain and yet efficiently elute target components, it is preferable to supply both the sample solution and water in the direction opposite to the eluting solvent, i.e. from the outlet end 7b to the inlet end 7a. It is evident that this can be achieved by simply adding a passage selector valve.

The invention claimed is:

1. A preparative separation/purification system for obtaining a target component in solid forms by vaporizing a solvent in a solution containing the target component obtained by a preparative separation process, comprising:
   a container rack;
   a container for collecting the target component in solid forms, the container being held in the container rack;
   a heating means for heating the container;
   a solution nozzle and a liquid supply means for supplying the solution so that the solution is dripped or poured into the container; and
   a gas ejection nozzle for producing a gas stream so as to break the solution dripped or poured from an end of the solution nozzle into fine droplets and scatter it within the container, where vaporization of the solvent in the solution is accelerated by producing the gas stream by the gas ejection nozzle so that the gas stream separates the solution into droplets and brings these droplets into contact with an inner wall of the container heated by the heating means, to obtain the target component in dry, solid forms, and for further producing a gas stream so that the gas stream is directly brought into contact with a pool of the solution formed by the droplets which flowed down on the inner wall of the container in order that vaporization of the solvent in the pool of the solution is accelerated by agitating the solution by the gas stream produced by the gas ejection nozzle and supplying heat by the heating means, to obtain the target component in dry, solid forms;
   wherein an end of the solution nozzle and an end of a gas ejection port of the gas ejection nozzle are located inside the container when the solution is dripped or poured into the container and the fine droplets are scattered within the container, and
   the gas injection port is located close to the end of the solution nozzle.

2. The preparative separation/purification system according to claim 1, which is characterized by further comprising a gas-heating means for heating a gas before the gas is ejected into the container by the gas ejection nozzle.

3. The preparative separation/purification system according to claim 2, which is characterized by further comprising a solution-heating means for heating the solution before the solution is dripped or poured into the container by the liquid supply means.

4. The preparative separation/purification system according to claim 1, which is characterized in that the end of the solution passage and a gas ejection port of the gas ejection nozzle constitutes a multi-tube structure with two or more tubes.

5. The preparative separation/purification system according to claim 2, which is characterized in that the end of the solution passage and a gas ejection port of the gas ejection nozzle constitutes a multi-tube structure with two or more tubes.

6. The preparative separation/purification system according to claim 3, which is characterized in that the end of the solution passage and a gas ejection port of the gas ejection nozzle constitutes a multi-tube structure with two or more tubes.

* * * * *